United States Patent
Hsu

(10) Patent No.: US 11,313,661 B2
(45) Date of Patent: Apr. 26, 2022

(54) ELECTROMAGNETIC INDUCTION TYPE COORDINATE POSITIONING APPARATUS

(71) Applicant: Shenzhen Pu Ying Innovation Technology Corp., LTD., Shenzhen (CN)

(72) Inventor: Chung-Wen Hsu, Shenzhen (CN)

(73) Assignee: Shenzhen Pu Ying Innovation Technology Corp., LTD., Shenzhen (CN)

(*) Notice: Subject to any disclaimer, the term of this patent is extended or adjusted under 35 U.S.C. 154(b) by 29 days.

(21) Appl. No.: 17/110,968

(22) Filed: Dec. 3, 2020

(65) Prior Publication Data
US 2021/0278194 A1   Sep. 9, 2021

(30) Foreign Application Priority Data
Mar. 6, 2020   (CN) .......................... 202010151265.7

(51) Int. Cl.
*G01B 7/00*   (2006.01)
*G06F 3/046*  (2006.01)
*G01B 7/30*   (2006.01)

(52) U.S. Cl.
CPC .............. *G01B 7/003* (2013.01); *G06F 3/046* (2013.01); *G01B 7/30* (2013.01)

(58) Field of Classification Search
CPC .. G01B 7/30; G01B 7/003; G01B 7/00; G06F 3/046; G06F 3/04182
See application file for complete search history.

(56) References Cited

U.S. PATENT DOCUMENTS

2014/0028587 A1* 1/2014 Sugiyama ............... G06F 3/046
                                                           345/173
2018/0307340 A1* 10/2018 Gotoh ..................... G06F 3/041

* cited by examiner

*Primary Examiner* — Jermele M Hollington
*Assistant Examiner* — Suresh K Rajaputra
(74) *Attorney, Agent, or Firm* — Rabin & Berdo, P.C.

(57) ABSTRACT

An electromagnetic induction type coordinate positioning apparatus includes a first induction coil, a second induction coil, a first amplification circuit, a second amplification circuit, and a control circuit. The first induction coil and the second induction coil respectively generate a first induction signal and a second induction signal when a pointer device comes close. The first amplification circuit and the second amplification circuit may be electrically connected to the first induction coil and the second induction coil, to receive the first induction signal and the second induction signal. The control circuit controls the first amplification circuit and the second amplification circuit to amplify the first induction signal and the second induction signal, so that a power level of the amplified first induction signal and a power level of the amplified second induction signal reach a first predefined level and a second predefined level.

9 Claims, 5 Drawing Sheets

ELECTROMAGNETIC INDUCTION TYPE COORDINATE POSITIONING APPARATUS

CROSS-REFERENCE TO RELATED APPLICATION

This non-provisional application claims priority under 35 U.S.C. § 119(a) to Patent Application No. 202010151265.7 filed in China, P.R.C. on Mar. 6, 2020, the entire contents of which are hereby incorporated by reference.

BACKGROUND

Technical Field

The present disclosure relates to an electromagnetic induction type coordinate positioning apparatus, and more particularly to an electromagnetic induction type coordinate positioning apparatus having an amplification circuit.

Related Art

Along with the progressing of technologies, electromagnetic induction type coordinate positioning apparatuses have been widely applied to various electronic device products such as mobile phones and tablet computers, and nowadays people are having higher requirements on electronic devices. To obtain a better visual experience, electronic devices are developing toward narrow-bezel designs. Narrow-bezel designs pose a great challenge to the layout of induction coils inside the electronic device. For an induction coil at the bezel, the voltage level of an induction signal generated by the induction coil often impacted due to the shrinkage of induction coil layout, resulting in unsmooth operation during use of the electromagnetic induction type coordinate positioning apparatus.

In addition, some elements in the electromagnetic induction type coordinate positioning apparatus affect the induction coil, weakening the magnetic field generated by the induction coil. For example, the electromagnetic induction type coordinate positioning apparatus includes metal elements and/or magnetic elements. Further, if an inappropriate accessory is used for the electromagnetic induction type coordinate positioning apparatus, the accessory also weakens the magnetic field generated by the induction coil. In addition, the induction signal is usually affected because the user places the electromagnetic induction type coordinate positioning apparatus too close to a paramagnetic or diamagnetic object. The above-mentioned problems are the most commonly seen problems that need to be solved urgently in the development of electromagnetic induction type coordinate positioning apparatuses.

SUMMARY

The present disclosure provides an electromagnetic induction type coordinate positioning apparatus, the electromagnetic induction type coordinate positioning apparatus includes a first induction coil, a second induction coil, a first amplification circuit, a second amplification circuit, and a control circuit. The first induction coil is configured to generate a first induction signal when a pointer device comes close. The second induction coil is configured to generate a second induction signal when the pointer device comes close. The first amplification circuit works at a first amplification gain, and is configured to electrically connect to one of the first induction coil and the second induction coil, to receive one of the first induction signal and the second induction signal. The second amplification circuit works at a second amplification gain, and is configured to electrically connect to the other one of the first induction coil and the second induction coil, to receive the other one of the first induction signal and the second induction signal. When the first amplification circuit and the second amplification circuit respectively receive the first induction signal and the second induction signal, the control circuit controls the first amplification circuit to amplify the first induction signal by the first amplification gain and controls the second amplification circuit to amplify the second induction signal by the second amplification gain, where the first amplification gain is greater than the second amplification gain; and, when the first amplification circuit and the second amplification circuit respectively receive the second induction signal and the first induction signal, the control circuit controls the second amplification circuit to amplify the first induction signal by the second amplification gain and controls the first amplification circuit to amplify the second induction signal by the first amplification gain, where the second amplification gain is greater than the first amplification gain, so that a power level of the amplified first induction signal reaches a first predefined level, and a power level of the amplified second induction signal reaches a second predefined level.

DETAILED DESCRIPTION

Figure 1:
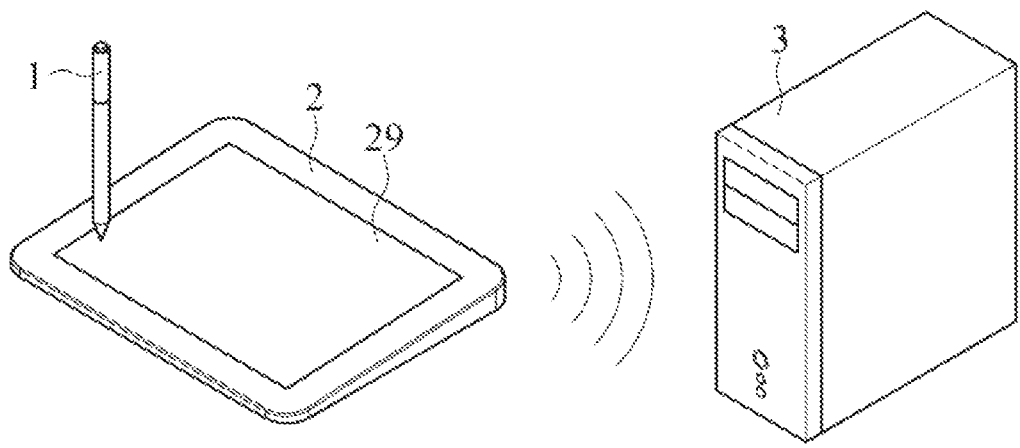
FIG. 1 is a diagram of an embodiment of an electromagnetic induction type coordinate positioning apparatus of the present invention and a pointer device applicable to the electromagnetic induction type coordinate positioning apparatus.
Figure 2:
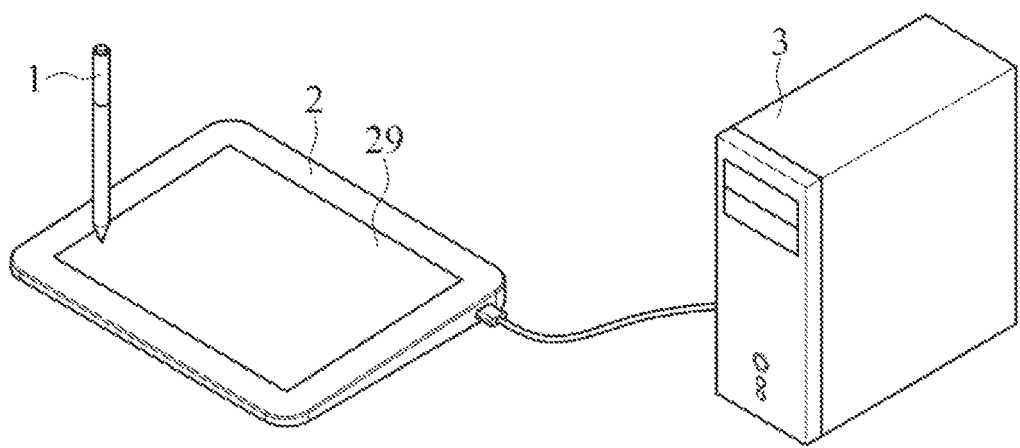
FIG. 2 is a diagram of another embodiment of an electromagnetic induction type coordinate positioning apparatus of the present invention and a pointer device applicable to the electromagnetic induction type coordinate positioning apparatus.

Referring to FIG. 1 and FIG. 2, FIG. 1 and FIG. 2 are diagrams of an embodiment of an electromagnetic induction type coordinate positioning apparatus 2 of the present invention and an embodiment of a pointer device 1 applicable to the electromagnetic induction type coordinate positioning apparatus 2. The electromagnetic induction type coordinate positioning apparatus 2 may be a mobile phone, a tablet computer, or a notebook computer. The electromagnetic induction type coordinate positioning apparatus 2 includes a working area 29. The pointer device 1 may or may not contact with the working area 29 of the electromagnetic induction type coordinate positioning apparatus 2. When the position of the pointer device 1 is close to the working area 29, the electromagnetic induction type coordinate positioning apparatus 2 may sense and calculate the position of the pointer device 1, and receive a signal sent by the pointer device 1. When the pointer device 1 is in contact with the electromagnetic induction type coordinate positioning apparatus 2, the electromagnetic induction type coordinate positioning apparatus 2 not only may sense and calculate the position of the pointer device 1, but also may receive a pressure signal from the pointer device 1. In addition, as shown in FIG. 1 and FIG. 2, the electromagnetic induction type coordinate positioning apparatus 2 may communicate with another electronic device 3 in a wired or wireless manner. In an embodiment, the electromagnetic induction type coordinate positioning apparatus 2 may be a writing tablet, a mobile phone, a tablet computer, a notebook computer, a digital tablet, or a smart notebook. The pointer device 1 may be an electromagnetic induction type stylus, mouse, or a puck. The electronic device 3 may be a mobile phone, a tablet computer, or a notebook computer.

In terms of configuration, induction coils 24, 25, and 26 are a plurality of turns of induction coils arranged along the same axial direction (for example, X axis and Y axis), and every two neighboring induction coils are arranged in a staggered manner. For example, two neighboring induction coils 24 and 25 are arranged in a staggered manner, two neighboring induction coils 25 and 26 are arranged in a staggered manner, and so on. The first induction coil 24 is coupled to the first amplification circuit 21 and the second amplification circuit 22, the second induction coil 25 is coupled to the first amplification circuit 21 and the second amplification circuit 22, and the first amplification circuit 21 and the second amplification circuit 22 are coupled to the control circuit 28. In other words, the first amplification circuit 21 is coupled between the first induction coil 24 and second induction coil 25 and the control circuit 28, and the second amplification circuit 22 is coupled between the first induction coil 24 and second induction coil 25 and the control circuit 28.

Figure 3:
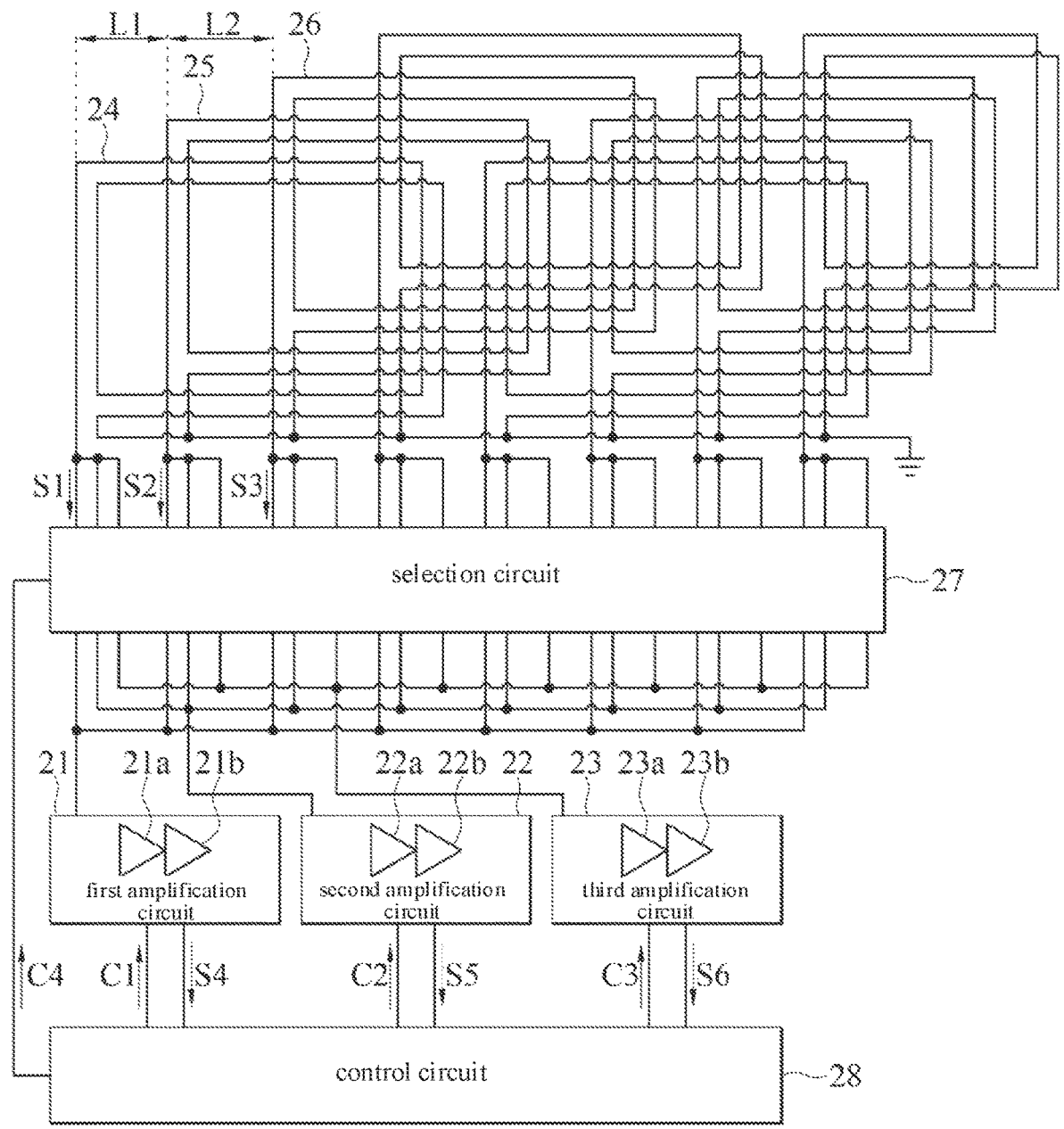
FIG. 3 is a diagram of an embodiment of an electromagnetic induction type coordinate positioning apparatus of the present disclosure.

A plurality of induction coils in the induction coils 24 to 26 may synchronously scan the position of the pointer device 1. When the pointer device 1 approaches the electromagnetic induction type coordinate positioning apparatus 2, an induction signal may be generated respectively between neighboring induction coils close to the pointer device 1 according to the position of the pointer device 1. For example, when the pointer device 1 is close to the first induction coil 24, the second induction coil 25 and the first induction coil 24 neighboring to each other may respectively generate a second induction signal S2 and a first induction signal S1, the induction signals S1 and S2 having different voltage levels. When the pointer device 1 is close to the second induction coil 25, the induction coils 24 and 26 and the second induction coil 25 neighboring to each other may respectively generate induction signals S1, S3 and S2, the induction signals S1, S3, and S2 having different voltage levels. The rest can be deduced by analogy, so the details will not be described herein. In an embodiment, the induction coils 24, 25, and 26 may each include a plurality of loops. FIG. 3 shows an example in which the induction coils 24 to 26 each include two loops.

The first amplification circuit 21 may be electrically connected to one of the first induction coil 24 and the second induction coil 25, and the second amplification circuit 22 may be electrically connected to the other one of the first induction coil 24 and the second induction coil 25. The first amplification circuit 21 has a first amplification gain, and the second amplification circuit 22 has a second amplification gain. The first amplification circuit 21 and the second amplification circuit 22 can amplify the first induction signal S1 and the second induction signal S2. In an embodiment, the induction coil layout of the first induction coil 24 is limited by space and/or architecture conditions of the electromagnetic induction type coordinate positioning apparatus 2. For example, the electromagnetic induction type coordinate positioning apparatus 2 includes a working area 29, the first induction coil 24 is closer to an edge of the working area 29 than the second induction coil 25 is, and layout space for the first induction coil 24 is smaller than that for the second induction coil 25. Therefore, limited by the space and/or architecture conditions of the electromagnetic induction type coordinate positioning apparatus 2, the voltage level of the first induction signal S1 generated by the first induction coil 24 cannot reach an ideal value, and compared with the second induction signal S2 generated by the second induction coil 25, the first induction signal S1 generated by the first induction coil 24 need to be amplified by the first amplification circuit 21 and the second amplification circuit 22.

Particularly, two cases are respectively described below. In one case, when the first amplification circuit 21 is electrically connected to the first induction coil 24 and the second amplification circuit 22 is electrically connected to the second induction coil 25, the first amplification circuit 21 receives the first induction signal S1 generated by the first induction coil 24, the second amplification circuit 22 receives the second induction signal S2 generated by the second induction coil 25, the control circuit 28 controls the first amplification circuit 21 to amplify the first induction signal S1 by the first amplification gain to generate an amplified first induction signal S4, and the control circuit 28 controls the second amplification circuit 22 to amplify the second induction signal S2 by the second amplification gain to generate an amplified second induction signal S5. Because the first amplification circuit 21 needs to additionally amplify the first induction signal S1, the first amplification gain is greater than the second amplification gain. For example, the second amplification gain may be 1, and the first amplification gain may be greater than 1, for example, the first amplification gain may be 1.2. Alternatively, the second amplification gain may be 2, and the first amplification gain may be 2.4, so that the strength level of the amplified first induction signal S4 reaches an ideal predefined level (hereinafter referred to as first predefined level), and the strength level of the amplified second induction signal S5 reaches another ideal predefined level (hereinafter referred to as second predefined level).

In the other case, when the first amplification circuit 21 is electrically connected to the second induction coil 25 and the second amplification circuit 22 is electrically connected to the first induction coil 24, the first amplification circuit 21 receives the second induction signal S2 generated by the second induction coil 25, the second amplification circuit 22 receives the first induction signal S1 generated by the first induction coil 24, the control circuit 28 controls the first amplification circuit 21 to amplify the second induction signal S2 by the first amplification gain to generate an amplified second induction signal S5, and the control circuit 28 controls the second amplification circuit 22 to amplify the first induction signal S1 by the second amplification gain to generate an amplified first induction signal S4. Because the second amplification circuit 22 needs to additionally amplify the first induction signal S1, the second amplification gain is greater than the first amplification gain. For example, the first amplification gain may be 1, and the second amplification gain may be greater than 1, for example, the second amplification gain may be 1.2. Alternatively, the first amplification gain may be 2, and the second amplification gain may be 2.4, so that the strength level of the amplified first induction signal S4 reaches an ideal first predefined level, and a the strength level of the amplified second induction signal S5 reaches an ideal second predefined level.

In some embodiments, the first predefined level and the second predefined level may vary with different locations of the pointer device 1 on the electromagnetic induction type coordinate positioning apparatus 2, and the first predefined level may be the same as or different from the second predefined level.

Based on this, when a user uses the electromagnetic induction type coordinate positioning apparatus 2, the amplification circuits 21 and 22 may adjust the voltage level of the first induction signal S1 by a larger amplification gain when receiving the first induction signal S1. In this way, the fading of the voltage of the first induction signal S1 generated by the first induction coil 24 due to the space and/or architecture limitations of the electromagnetic induction type coordinate positioning apparatus 2 to cause less sensitivity or unsmooth operation or even affect the accuracy of the electromagnetic induction type coordinate positioning apparatus 2 in detecting the coordinates of the writing activities of pointer device can be avoided, and the user can operate the pointer device 1 and the electromagnetic induction type coordinate positioning apparatus 2 more smoothly and conveniently.

In some embodiments, as shown in FIG. 3, the electromagnetic induction type coordinate positioning apparatus 2 further includes a third induction coil 26 and a third amplification circuit 23. The third induction coil 26 is coupled to the first amplification circuit 21, the second amplification circuit 22, and the third amplification circuit 23. The third amplification circuit 23 is also coupled to the control circuit 28. The induction coils 24, 25, and 26 are arranged in such an order that the second induction coil 25 is located between the first induction coil 24 and the third induction coil 26, the first induction coil 24 is neighboring to the second induction coil 25, and the second induction coil 25 is neighboring to the third induction coil 26. In other words, as for the same positions on each of the first induction coil 24, the second induction coil 25, and the third induction coil 26 are marked as a measurement points, the distance between the positions of the first induction coil 24 and the third induction coil 26 is greater than the distance L2 between the positions of the neighboring second induction coil 25 and the third induction coil 26, and the distance L2 between the positions of the neighboring second induction coil 25 and the third induction coil 26 is greater than the distance L1 between the positions of the neighboring first induction coil 24 and the second induction coil 25.

As described above, the induction coil layout in the electromagnetic induction type coordinate positioning apparatus 2 is limited by the space and/or architecture conditions of the electromagnetic induction type coordinate positioning apparatus 2. For example, because the first induction coil 24 is limited by the space at the edge of the electromagnetic induction type coordinate positioning apparatus 2, the overall width of the first induction coil 24 is reduced. In other words, the distance L1 between the first induction coil 24 and the second induction coil 25 is less than the distance L2 between the third induction coil 26 and the second induction coil 25, that is, an overall coil width of the first induction coil 24 is less than overall coil widths of the second induction coil 25 and the third induction coil 26. Therefore, when one of the amplification circuits 21, 22, and 23 receives the first induction signal S1 generated by the first induction coil 24, the amplification circuit receiving the first induction signal S1 needs to additionally amplify the first induction signal S1.

In some embodiments, for example, the induction coil layouts of the first induction coil 24 and the second induction coil 25 are both limited by the space and/or architecture conditions of the electromagnetic induction type coordinate positioning apparatus 2, that is, the widths of the induction coils 24 and 25 are both reduced, where the overall coil width of the first induction coil 24 is less than the overall coil width of the second induction coil 25, and the overall coil width of the second induction coil 25 is less than the overall coil width of the third induction coil 26. When two of the amplification circuits 21, 22, and 23 respectively receive the first induction signal S1 and the second induction signal S2, the amplification circuit receiving the first induction signal S1 and the amplification circuit receiving the second induction signal S2 need to additionally amplify the first induction signal S1 and the second induction signal S2 respectively.

For example, in an example where the first amplification circuit 21, the second amplification circuit 22, and the third amplification circuit 23 respectively receive the first induction signal S1, the second induction signal S2, and the third induction signal S3, the first amplification gain and the second amplification gain are greater than an amplification gain of the third amplification circuit 23 (hereinafter referred to as third amplification gain), and the first amplification gain is greater than the second amplification gain. For example, the first amplification gain, the second amplification gain, and the third amplification gain may respectively be 1.2, 1.1, and 1.

In some embodiments, the electromagnetic induction type coordinate positioning apparatus 2 further includes a magnetic permeable film disposed below the induction coils 24, 25, and 26. During the layout, whether the permeability of the magnetic permeable film affects the operation of a micro-electromechanical device for detecting the geomagnetism in an electronic compass in the electromagnetic induction type coordinate positioning apparatus 2. If the magnetic permeable film is close to the micro-electromechanical device, that is, the distance between the magnetic permeable film and the micro-electromechanical device falls within an interference range where the operation of the micro-electromechanical device is affected, the permeability of the magnetic permeable film needs to be lowered, so as not to affect the operation of the micro-electromechanical device. Therefore, when the permeability of the magnetic permeable film is lowered, for example, when the permeability is less than a predefined value, if the pointer device 1 moves close to the induction coils 24, 25, and 26, the lowered permeability leads to that the strength level of the first induction signal S1 generated by the first induction coil 24 cannot reach the first predefined level before amplification, the strength level of the second induction signal S2 generated by the second induction coil 25 cannot reach the second predefined level before amplification, and the strength level of the third induction signal S3 generated by the third induction coil 26 cannot reach an ideal third predefined level before amplification. In this case, the control circuit 28 controls the amplification circuits 21, 22, and 23 to additionally amplify first induction signals S1, S2, and S3, that is, the first amplification gain, the second amplification gain, and the third amplification gain are all greater than 1.

In addition, in the case that the above permeability decreases, when the pointer device 1 is close to the induction coils 24, 25, and 26, because the strength levels of the induction signals S1, S2, and S3 have an inverse-square relationship with the distances between the induction coils 24, 25, and 26 and the pointer device 1, the control circuit 28, when controlling the amplification circuits 21, 22, and 23, respectively select the first amplification gain, the second amplification gain, and the third amplification gain of the amplification circuits 21, 22, and 23 according to the distances between the induction coils 24, 25, and 26 and the pointer device 1. In an example where the control circuit 28 determines that the distance between the pointer device 1 and the first induction coil 24 is greater than the distance between the pointer device 1 and the second induction coil 25 and the distance between the pointer device 1 and the second induction coil 25 is greater than the distance between the pointer device 1 and the third induction coil 26, considering the decrease in the magnetic permeability, when the amplification circuits 21, 22, and 23 respectively receive the induction signals S1, S2, and S3, the first amplification gain, the second amplification gain, and the third amplification gain selected by the control circuit 28 may respectively be 1.4, 1.2, and 1.1; when the amplification circuits 21, 22, and 23 respectively receive the induction signals S2, S1, and S3, the first amplification gain, the second amplification gain, and the third amplification gain may respectively be 1.2, 1.4, and 1.1; and so on. The control circuit 28 may accurately calculate coordinate information of the pointer device 1 according to the amplified induction signals S4, S5, and S6, enabling the user to operate the electromagnetic induction type coordinate positioning apparatus 2 more smoothly.

In some embodiments, the induction signals S1, S2, and S3 generated by the induction coils 24, 25, and 26 are affected by a magnetic element included in an accessory used outside the electromagnetic induction type coordinate positioning apparatus 2. The magnetic element may be a magnet used on a leather case of the electromagnetic induction type coordinate positioning apparatus 2. When the magnetic element such as a magnet approaches the electromagnetic induction type coordinate positioning apparatus 2, for example, when the magnetic element approaches the first induction coil 24, the first induction signal S1 generated by the first induction coil 24 impacted due to the influence of the magnetic element, and one of the amplification circuits 21, 22, and 23 needs to additionally amplify/lessen the first induction signal S1 when receiving the first induction signal S1, so that the control circuit 28 can accurately calculate the coordinate information of the pointer device 1 according to the amplified/lessened induction signals S4, S5, and S6.

In some embodiments, the electromagnetic induction type coordinate positioning apparatus 2 further includes a wireless communication module. To avoid interference, the circuit of the wireless communication module is shielded by metal. The shielding metal element is also an element affecting magnetic excitation signals. For example, the first induction coil 24 in the induction coils 24, 25, and 26 is affected by the metal element, that is, the vertical distance between the first induction coil 24 and the metal element is less than the non-interfering or less-interfering predefined distance, and the vertical distances between the induction coils 25 and 26 and the metal element are greater than the non-interfering or less-interfering predefined distance. The non-interfering or less-interfering predefined distance may vary with different electromagnetic induction type coordinate positioning apparatuses 2. For example, the first induction signal S1 generated by the first induction coil 24 impacted due to the influence of the metal element, and one of the amplification circuits 21, 22, and 23 needs to additionally amplify the first induction signal S1 when receiving the first induction signal S1, so that the control circuit 28 may accurately calculate coordinate information of the pointer device 1 according to the amplified induction signals S4, S5, and S6, and the user may operate the electromagnetic induction type coordinate positioning apparatus 2 more smoothly.

In some embodiments, as shown in FIG. 3, the electromagnetic induction type coordinate positioning apparatus 2 further includes a selection circuit 27. The selection circuit 27 is coupled between the induction coils 24, 25, and 26 and the amplification circuits 21, 22, and 23. The selection circuit 27 is controlled by the control circuit 28. The selection circuit 27 selects, according to a control signal C4 generated by the control circuit 28, to electrically connect the first induction coil 24, the second induction coil 25, and the third induction coil 26 respectively to which one of the first amplification circuit 21, the second amplification circuit 22, and the third amplification circuit 23, so as to electrically connect the induction coils 24, 25, and 26 to the amplification circuits 21, 22, and 23 in a one-to-one correspondence. For example, when the selection circuit 27 controls the first amplification circuit 21 to electrically connect to the first induction coil 24, the selection circuit 27 controls the amplification circuits 22 and 23 not to electrically connect to the first induction coil 24, and the selection circuit 27 controls the second amplification circuit 22 to electrically connect to one of the induction coils 25 and 26, and controls the third amplification circuit 23 to electrically connect to the other one of the induction coils 25 and 26. The rest can be deduced by analogy, and the details will not be described herein.

Figure 4:
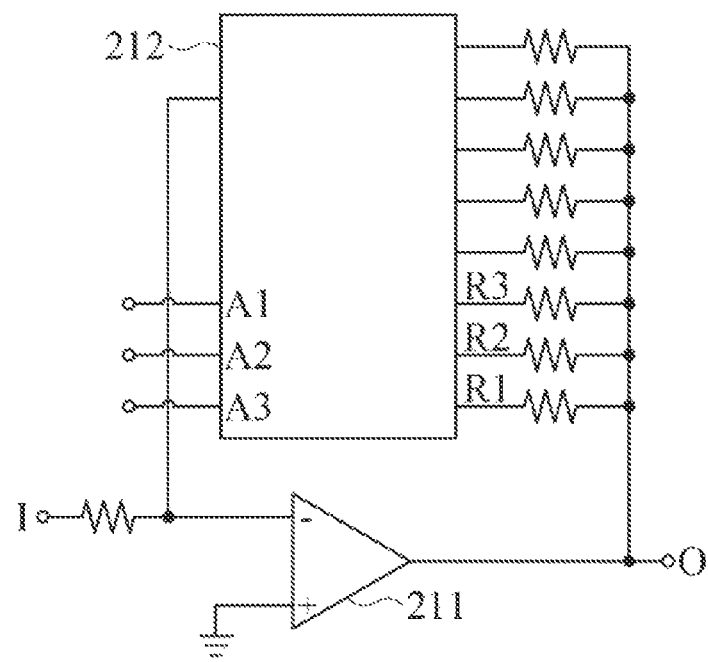
FIG. 4 is a circuit diagram of an embodiment of an amplification circuit of the electromagnetic induction type coordinate positioning apparatus of FIG. 3.

In some embodiments, referring to FIG. 3 and FIG. 4, FIG. 4 is a circuit diagram of an embodiment of an amplification circuit of the electromagnetic induction type coordinate positioning apparatus 2 of FIG. 3. The first amplification circuit 21, the second amplification circuit 22, and the third amplification circuit 23 each include an operational amplifier 211, a plurality of resistors R1, R2, and R3, and a selector 212, and respectively receive a control signal C1, a control signal C2, and a control signal C3 generated by the control circuit 28. FIG. 4 shows the first amplification circuit 21 as an example of the amplification circuits, where the number of resistors in the first amplification circuit 21 is 8, and three of the resistors are shown. The first amplification circuit 21 includes an operational amplifier 211, a plurality of resistors R1, R2, and R3, and a selector 212. As shown in FIG. 4, the operational amplifier 211 has a negative input end I and an output end O, the resistors R1, R2, and R3 are coupled to the output end O, and the selector 212 is coupled between the resistors R1, R2, and R3 and the negative input end I.

Figure 5:
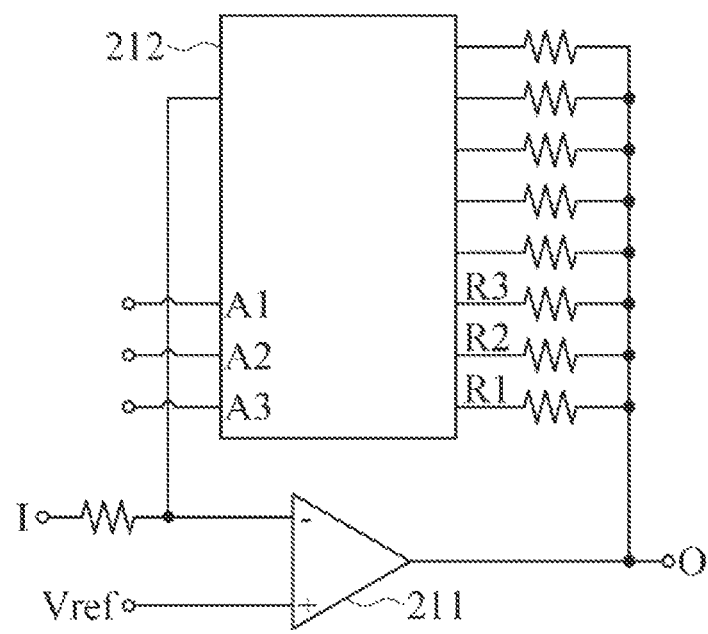
FIG. 5 is a circuit diagram of another embodiment of an amplification circuit of the electromagnetic induction type coordinate positioning apparatus of FIG. 3.
Figure 6:
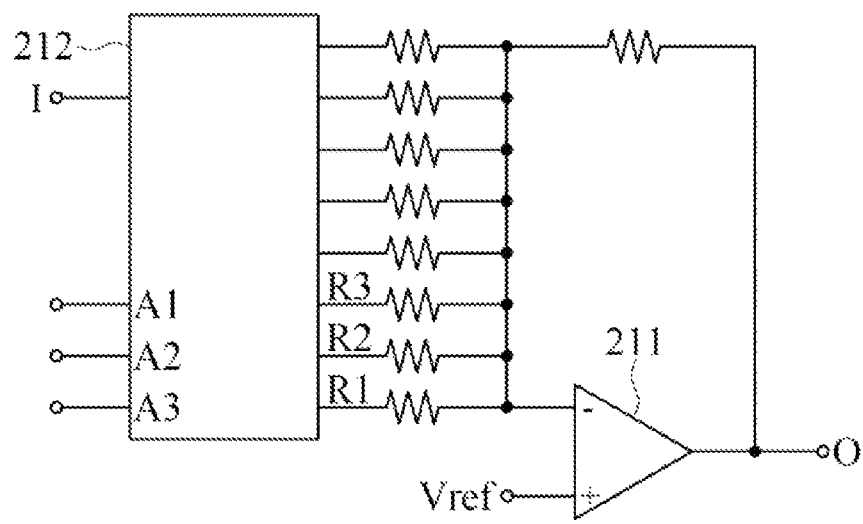
FIG. 6 is a circuit diagram of another embodiment of an amplification circuit of the electromagnetic induction type coordinate positioning apparatus of FIG. 3.
Figure 7:
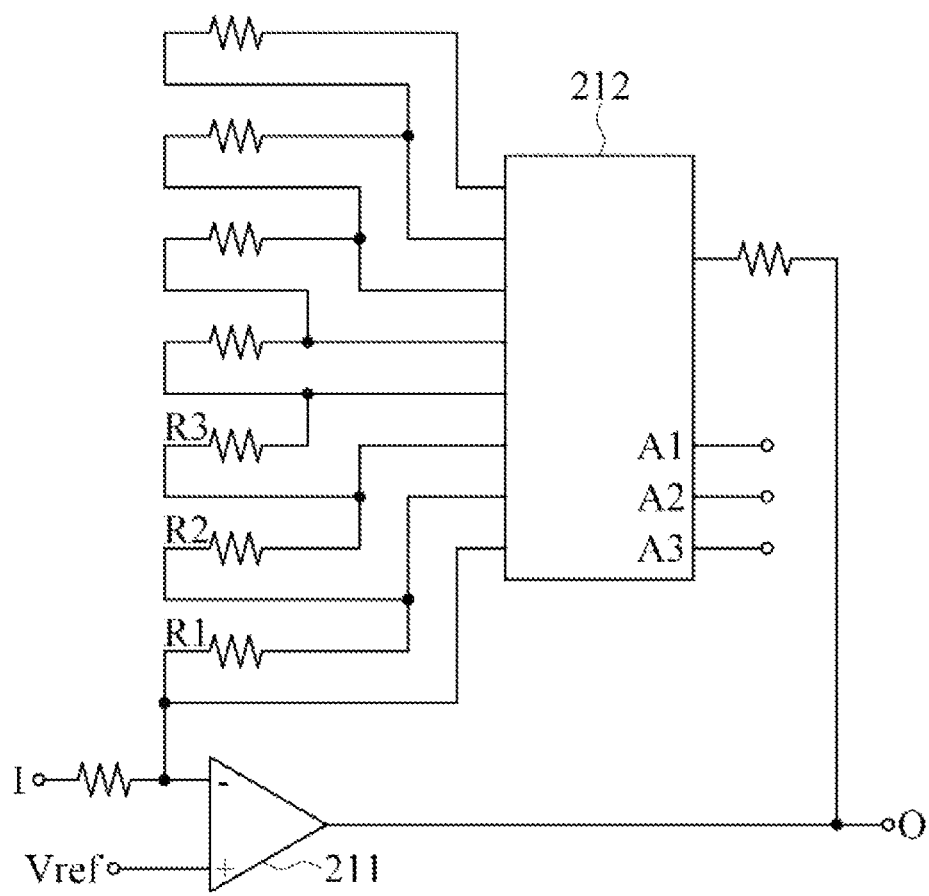
FIG. 7 is a circuit diagram of another embodiment of an amplification circuit of the electromagnetic induction type coordinate positioning apparatus of FIG. 3.

The resistors R1, R2, and R3 have different resistance values, by which the first amplification gain between an input signal and an output signal of the operational amplifier 211 is determined. The induction signals S1, S2, and S3 generated by the induction coils 24, 25, and 26 are transferred to the negative input end I of the operational amplifier 211, and control pins A1, A2, and A3 of the selector 212 receive the control signal C1 generated by the control circuit 28 and select, according to the control signal C1, to electrically connect to one of the resistors R1, R2, and R3. In this case, the induction signals S1, S2, and S3 flow through the resistor in the resistors R1, R2, and R3 which is electrically connected to the selector 212, and the operational amplifier 211 generates amplified induction signals S4, S5, and S6 according to the first amplification gain determined by the resistor electrically connected to the selector 212, and outputs the amplified induction signals S4, S5, and S6 through the output end O of the operational amplifier 211. For the operational amplifier 211, the plurality of resistors R1, R2, and R3, and the selector 212 in the second amplification circuit 22 and the third amplification circuit 23, reference may be made to the foregoing descriptions. The present disclosure is not limited to FIG. 4, and in some other embodiments, the amplification circuits 21, 22, and 23 may also be implemented by implementation aspects shown in FIG. 5 to FIG. 7.

In some embodiments, the control signal C1 may be represented by three bits, and the control pins A1, A2, and A3 each correspond to one of the three bits. In other embodiments, the control signal C1 may have more than three bits including three bits corresponding to the control pins A1, A2, and A3. For the control signals C2 and C3, reference may be made the description of the control signal C1, and the details will not be described herein.

In some embodiments, the control circuit 28 determines the first amplification gain, the second amplification gain, and the third amplification gain according to a predefined gain table. The predefined gain table records different gain values. The control circuit 28 selects gain values from the predefined gain table, and transfers, according to the selected gain values, the control signals C1, C2, and C3 to the control pins A1, A2, and A3 of the selector 212, to determine to electrically connect to one of the resistors R1, R2, and R3. The predefined gain table is as shown in the following table. In an example where the first induction coil 24 is electrically connected to the first amplification circuit 21, the second induction coil 25 is electrically connected to the second amplification circuit 22, and the third induction coil 26 is electrically connected to the third amplification circuit 23, when the bits of the control signal C1 received by the control pins A1-A3 of the selector 212 of the first amplification circuit 21 are respectively 0, 1, and 0, the gain value of the corresponding first amplification gain is 1.2, that is, the first induction signal S1 generated by the first induction coil 24 is amplified by 1.2 times. The rest can be deduced by analogy, so the details will not be described herein.

|  | Control pin A1 | Control pin A2 | Control pin A3 | Gain value | |
|---|---|---|---|---|---|
| First induction coil 24 | 0 | 1 | 0 | 1.2 | First amplification gain |
| Second induction coil 25 | 0 | 0 | 1 | 1.1 | Second amplification gain |
| Third induction coil 26 | 0 | 0 | 0 | 1 | Third amplification gain |

In some embodiments, as shown in FIG. 3, the amplification circuits 21, 22, and 23 respectively include first-stage amplifiers 21a, 22a, and 23a and second-stage amplifiers 21b, 22b, and 23b. The first-stage amplifier 21a and the second-stage amplifier 21b of the first amplification circuit 21 are used as an example for description below. The circuit structure of the first-stage amplifier 21a may be a circuit structure shown in FIG. 4 to FIG. 7. The first-stage amplifier 21a is configured to additionally amplify the first induction signal S1 according to the influence of the distances between the induction coils 24, 25, and 26, a magnetic object for detecting the geomagnetism, a magnetic element close to the electromagnetic induction type coordinate positioning apparatus 2, and an antenna metal element on the induction signals S1, S2, and S3. The second-stage amplifier 21b is configured to adjust signal strength levels of the induction signals S1, S2, and S3 according to the use manner of the user when operating the pointer device 1 and the electromagnetic induction type coordinate positioning apparatus 2. The use occasion may be signal strength adjusting when the pointer device 1 is in hovering and/or operated with an tilt angle between the pointer device 1 and the electromagnetic induction type coordinate positioning apparatus 2, both of which may influence the signal strength levels of the induction signals S1, S2, and S3. Therefore, the control circuit 28 controls the amplification gain of the second-stage amplifier 21b according to the hovering of the pointer device 1, the tilt angle between the pointer device 1 and the electromagnetic induction type coordinate positioning apparatus 2, or a combination thereof, the amplification gain of the first-stage amplifier 21a is multiplied by the amplification gain of the second-stage amplifier 21b to come out the first amplification gain, and the control circuit 28 controls, according to the first amplification gain, the first-stage amplifier 21a and the second-stage amplifier 21b to amplify the induction signals S1, S2, and S3.

Figure 8:
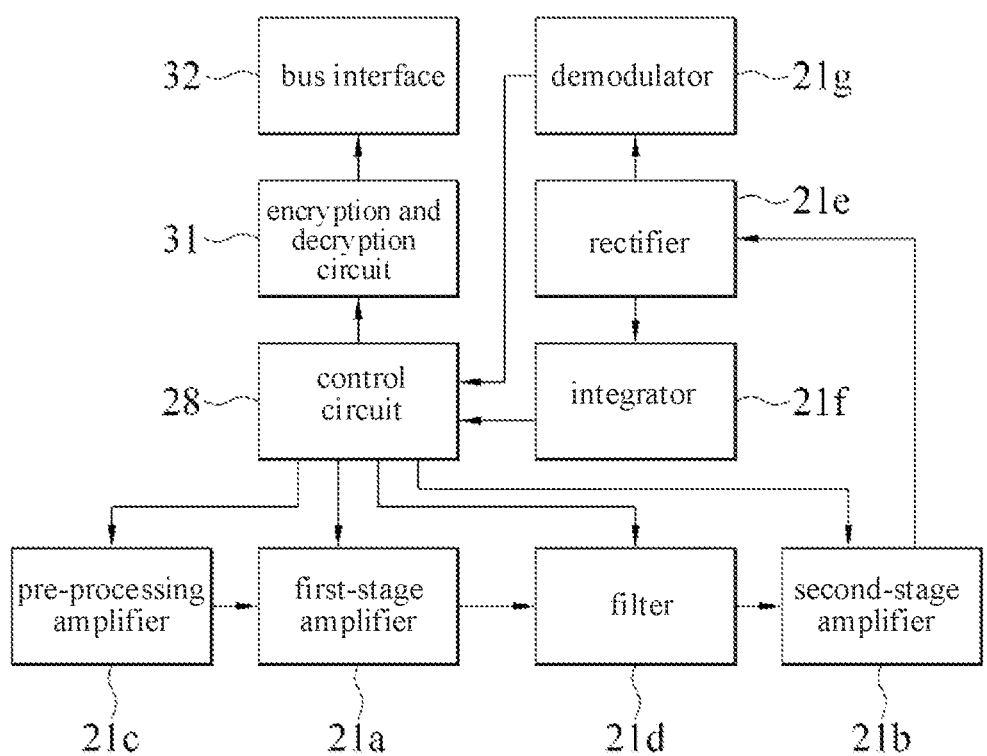
FIG. 8 is a block diagram of an embodiment of other signal processing circuits coupled to the amplification circuit and the control circuit of FIG. 3.

In an embodiment, the amplification circuits 21, 22, and 23 respectively include a pre-processing amplifier respectively coupled to the first-stage amplifiers 21a, 22a, and 23a. The pre-processing amplifiers respectively receive the induction signals S1-S3 from the induction coils 24-26. The pre-processing amplifiers are controlled by the control circuit 28 to amplify the induction signals S1-S3 by the same amplification gain. Taking the first amplification circuit 21 as an example, FIG. 8 shows a pre-processing amplifier 21C of the first amplification circuit 21, and the first-stage amplifier 21a is coupled between the pre-processing amplifier 21c and the second-stage amplifier 21b. In an example where the first amplification circuit 21 receives the first induction signal S1, the pre-processing amplifier 21c first amplifies the first induction signal S1. After the pre-processing amplifier 21c amplifies the first induction signal S1, the first-stage amplifier 21a performs a second amplification process, and then the second-stage amplifier 21b performs a third amplification process.

In an embodiment, as shown in FIG. 8, the electromagnetic induction type coordinate positioning apparatus 2 further includes a filter 21d, a rectifier 21e, an integrator 21f, and a demodulator 21g to perform a filtering process, a rectification process, an integration process, and a demodulation process. In addition, the electromagnetic induction type coordinate positioning apparatus 2 may further include an encryption and decryption circuit 31 and a bus interface 32. The encryption and decryption circuit 31 is coupled between the bus interface 32 and the control circuit 28.

In some embodiments, The control circuit 28 may be a micro control unit (MCU), a central processing unit (CPU), an embedded controller (EC), or an application-specific integrated circuit (ASIC). The selection circuit 27 may be a multiplexer (MUX) or a switch.

Based on the above, according to an embodiment of the electromagnetic induction type coordinate positioning apparatus of the present disclosure, the electromagnetic induction type coordinate positioning apparatus can perform signal strength level correction according to the width-reduced induction coils, the magnetic permeable film with lower permeability, the accessory having the magnetic element, and the induction signals generated by the induction coils close to the metal element for shielding the wireless communication module, so as to prevent the signal strength of the induction signals of some induction coils from being excessively small to cause less sensitivity or unsmooth operation when the user operates the electromagnetic induction type coordinate positioning apparatus or even affect the accuracy of the electromagnetic induction type coordinate positioning apparatus in detecting the coordinates of a touch action, thereby providing better experience for the user operating the electromagnetic induction type coordinate positioning apparatus.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electromagnetic induction type coordinate positioning apparatus, adapted for a pointer device, the apparatus comprising: a first induction coil, configured to generate a first induction signal when a pointer device comes close; a second induction coil, configured to generate a second induction signal when the pointer device comes close; a first amplification circuit, coupled to the first induction coil and the second induction coil, working at a first amplification gain, and configured to electrically connect to one of the first induction coil and the second induction coil, to receive one of the first induction signal and the second induction signal; a second amplification circuit, coupled to the first induction coil and the second induction coil, working at a second amplification gain, and configured to electrically connect to the other one of the first induction coil and the second induction coil, to receive the other one of the first induction signal and the second induction signal; and a control circuit, coupled to the first amplification circuit and the second amplification circuit, and configured to: when the first amplification circuit and the second amplification circuit respectively receive the first induction signal and the second induction signal, control the first amplification circuit to amplify the first induction signal by the first amplification gain and control the second amplification circuit to amplify the second induction signal by the second amplification gain, wherein the first amplification gain is greater than the second amplification gain; and configured to: when the first amplification circuit and the second amplification circuit respectively receive the second induction signal and the first induction signal, control the first amplification circuit to amplify the second induction signal by the first amplification gain and control the second amplification circuit to amplify the first induction signal by the second amplification gain, where the second amplification gain is greater than the first amplification gain, so that a strength level of the amplified first induction signal reaches a first predefined level, and a strength level of the amplified second induction signal reaches a second predefined level, further comprising a third induction coil, coupled to the first amplification circuit and the second amplification circuit, wherein a vertical distance between the third induction coil and the first induction coil is greater than a vertical distance between the third induction coil and the second induction coil, and the vertical distance between the third induction coil and the second induction coil is greater than a vertical distance between the second induction coil and the first induction coil".

2. The electromagnetic induction type coordinate positioning apparatus according to claim 1, wherein an overall coil width of the first induction coil is less than an overall coil width of the second induction coil.

3. The electromagnetic induction type coordinate positioning apparatus according to claim 1, further comprising a magnetic permeable film disposed below the first induction coil and the second induction coil, wherein a permeability of the magnetic permeable film is less than a predefined value so that the first induction signal cannot reach the first predefined level before amplification and the second induction signal cannot reach the second induction signal before amplification, when controlling the first amplification circuit and the second amplification circuit, the control circuit respectively controls the first amplification circuit and the second amplification circuit according to the first amplification gain which is greater than 1 and the second amplification gain which is greater than 1, and when the pointer device is close to the first induction coil and the second induction coil, a distance between the first induction coil and the pointer device is greater than a distance between the second induction coil and the pointer device.

4. The electromagnetic induction type coordinate positioning apparatus according to claim 1, wherein the electromagnetic induction type coordinate positioning apparatus is adapted for an accessory having a magnetic element, a distance between the first induction coil and the magnetic element is less than a predefined distance, and a distance between the second induction coil and the magnetic element is greater than the predefined distance.

5. The electromagnetic induction type coordinate positioning apparatus according to claim 1, further comprising a wireless communication module and a metal element configured to shield the wireless communication module, wherein a vertical distance between the first induction coil and the metal element is less than a predefined distance, and a vertical distance between the second induction coil and the metal element is greater than the predefined distance.

6. The electromagnetic induction type coordinate positioning apparatus according to claim 1, wherein the first amplification circuit and the second amplification circuit each comprise:
   an operational amplifier, having a negative input end and an output end;
   a plurality of resistors, coupled to the output end, and having different resistance values; and
   a selector, coupled between the plurality of resistors and the negative input end, and controlled by the control circuit.

7. The electromagnetic induction type coordinate positioning apparatus according to claim 1, wherein the control circuit controls the first amplification gain and the second amplification gain according to signal strength generated when the pointer device is in hovering, an tilt angle between the pointer device and the electromagnetic induction type coordinate positioning apparatus, or a combination thereof, so that the strength level of the amplified first induction signal reaches the first predefined level, and the strength level of the amplified second induction signal reaches the second predefined level.

8. The electromagnetic induction type coordinate positioning apparatus according to claim 1, further comprising a selection circuit coupled to the first induction coil, the second induction coil, the first amplification circuit, and the second amplification circuit, wherein the selection circuit is controlled by the control circuit, and the selection circuit is configured to electrically connect the first amplification circuit to one of the first induction coil and the second induction coil, and electrically connect the second amplification circuit to the other one of the first induction coil and the second induction coil.

9. The electromagnetic induction type coordinate positioning apparatus according to claim 1, when the first amplification circuit and the second amplification circuit respectively receive the first induction signal and the second induction signal, the first amplification gain is greater than 1, and the second amplification gain is equal to 1; and when the first amplification circuit and the second amplification circuit respectively receive the second induction signal and the first induction signal, the first amplification gain is equal to 1, and the second amplification gain is greater than 1.

* * * * *